Jan. 8, 1935.  C. A. SUNDBOM  1,987,274
BUCKET CONVEYER
Filed April 26, 1934
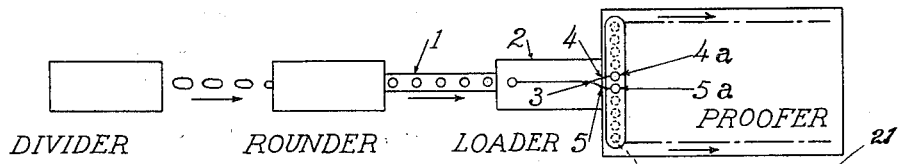
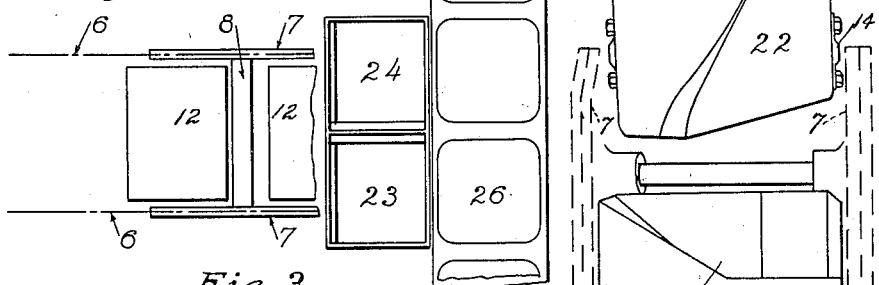
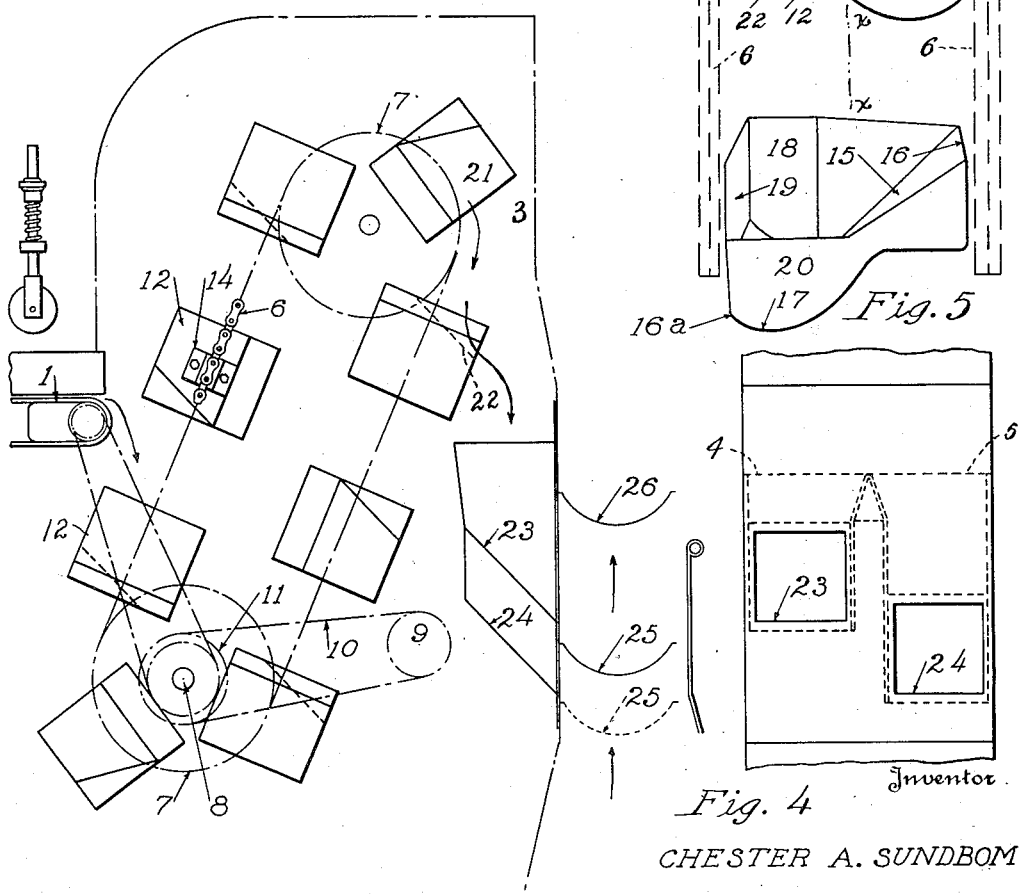
Inventor
CHESTER A. SUNDBOM
By George B. Willcox
Attorney Patented Jan. 8, 1935

1,987,274

UNITED STATES PATENT OFFICE 1,987,274

BUCKET CONVEYER

Chester A. Sundbom, Saginaw, Mich., assignor to Baker Perkins Company, Inc., Saginaw, Mich., a corporation of New York Application April 26, 1934, Serial No. 722,427

7 Claims. (Cl. 198—152)

This invention relates to conveying systems and pertains more particularly to bucket type conveyers.

The objects of the invention are, to provide a bucket conveyer that shall be capable of receiving bodies of material that are delivered to it in a row, or one at a time, and delivering them in two places that are located side by side, instead of at a single point, as has been common practice.

The invention is found in a novel bucket structure, a new mode of operation of the buckets, and in their advantageous arrangement on the conveyer chains.

A further feature of the invention consists in a novel discharge means for the apparatus whereby the pieces delivered therefrom will be guided to a moving tray conveyer or equivalent device in such a manner that they will be deposited on the trays side by side.

The invention also comprises a novel arrangement of mechanisms whereby the pieces of material are delivered to the bucket conveyer in regular order one after the other and are deposited by it side by side on moving conveyer trays; the action of the depositing means, the speed of the bucket elevator, the distance between the buckets, and the relative spacing of the trays on the tray conveyer being all coordinated and synchronized so that the operation of taking pieces from the continuously moving row and depositing them side by side on the moving tray conveyer will be accomplished automatically, and with precision.

There are numerous applications for a device of this character which are known to those skilled in the conveyer art, but for purpose of illustration and not, however, as a limitation of my invention, I will show and describe herein its application to the bread making art.

With the foregoing and certain other objects in view which will appear later in the specification, my invention comprises the devices described and claimed and the equivalents thereof.

In the drawing Fig. 1 is a diagrammatic plan view showing the relative arrangement of a supply conveyer taking material from a divider, a rounder, and a loader, the latter embodying my invention, and delivering to a proofer.

Fig. 2 is a side elevation of the loader indicated in Fig. 1.

Fig. 3 is a top plan view of the bucket discharge portion of the loader shown in Fig. 2.

Fig. 4 is a front elevation of the discharge end of the machine as seen when viewed from the right in Fig. 2.

Fig. 5 is a perspective view of the top portion of the bucket conveyer as seen from the left in Fig. 2, the chains and sprockets being indicated by dotted lines.

Referring to the use of the machine in bakeries, it is to be noted that in commercial bread making establishments it is customary to divide a batch of raised dough into loaf pieces by means of a dough divider. The pieces are then rolled in a balling machine or rounder, discharged one at a time and finally conveyed in a continuous row to a proofer where as fast as they arrive the pieces are manually arranged side by side on traveling trays that hold about eight or ten pieces each. The trays are long and narrow and extend crosswise of their direction of travel through the proofer. Certain types of more recently developed proofers avoid the manual operation of tray loading by using mechanical devices for that purpose, but none so far as I am aware possess the compactness and speed of loading that are characteristic of my present invention.

Referring to Fig. 1, bodies of material, for example, pieces of dough that have been taken from a dough divider and passed through a rounder, are conveyed by a traveling belt 1 or otherwise in single file, and are delivered to the bucket elevator or loader 2, which in turn transfers the pieces to a delivery zone 3, and discharges them, one after another, in two places 4, 5 located side by side in spaced relation, and designated as depositing stations. From these two stations the pieces are chuted to the moving trays of the proofer, or to any other appropriate destination.

In the typical embodiment of the invention herein shown the bucket conveyer is of the elevating inclined type consisting of two chains 6, 6 spaced apart and mounted on pairs of sprocket wheels 7, 7. One pair of wheels is fixed to a drive shaft 8 which is actuated by a motor 9 through a drive chain 10 and a driven sprocket 11 on the shaft. Receptacles, such as buckets 12 are mounted on the chains at appropriately spaced intervals by means of lugs 14. The buckets receive the pieces from the conveyer belt 1 and discharge them by tilting while passing around the wheels 7 at the top of the conveyer.

Referring to Fig. 5, it is seen that each bottom 15 slopes downward from the top edge 16 of one end toward the bottom edge 16a of the other end, and at its lowest part is shaped to present a pocket 17. There is an upright rear wall 18 and an upright end wall 19, and also a front wall 20 that encloses the pocket 17 only, leaving that part of the sloping bottom 15 which is above the pocket unenclosed. Thus approximately half the length of the bottom on each side of the median line X—X of the conveyer constitutes a laterally sloping apron with an open front, the other half being occupied by the shallow walled-in pocket 17, so that a dough piece dropped at random into the bucket will be constrained to pass down into the pocket in a direction transverse to the direction of travel of the conveyer when loaded, and remain there until the bucket goes around the top delivery sprockets 7. The piece then rolls or slides down the tilted rear wall 18, as indicated in Fig. 5, and is discharged to one of the depositing stations 4 or 5 off-side of the median plane of the conveyer.

Some of the buckets are arranged for right-hand delivery, other left-hand. Preferably they alternate, as shown in Fig. 5, so that the total material is divided into two equal lots, although they may be arranged for any desired proportionate delivery, right-hand or left-hand.

If the buckets are placed quite close together on the conveyer, as shown in Fig. 2, the pieces discharged from a bucket 21 are preferably guided in their fall by an apron-like member 22 provided on the bottom of the preceding bucket in such a way as to deflect them toward the depositing stations. By this expedient I am enabled to increase the carrying capacity of the conveyer by arranging the buckets close together, without increasing the speed of travel, and without employing any idler or dumping pulley for the conveyer.

Adjacent the depositing stations 4, 5 there are two chutes 23, 24 inclined downwardly toward their delivery ends, these being located in laterally offset relation, as shown in Fig. 4. One chute 23 has its delivery end located higher than the delivery end of the other chute 24.

By this relative arrangement of the chutes the pieces can be delivered in two parallel rows upon any suitable moving carrier that is arranged to travel away from the bucket conveyer in any appropriate path, say, upward, downward, or to the right in Fig. 1. For example, I have illustrated a series of trays 25, 26 of a traveling dough proofer, the trays moving upwardly past the delivery ends of the chutes 23, 24 in timed relation to the respective deliveries therefrom. Thereby two pieces, one from each chute, are deposited on each tray in laterally spaced alinement as shown at 4a, 5a.

The proofer trays 25, 26, as above stated, are usually long enough to accommodate a considerable number of pieces, say, eight or ten, and the bucket conveyer will deliver two pieces on the middle portion of the length of each tray. The proofer, not illustrated in full, is commonly provided with appropriate automatic mechanism for turning the dough pieces over during the proofing process, and it has devices of known construction for automatically transferring each piece from one tray to another while turning and at the same time moving it nearer to the end of the tray in successive steps, finally discharging it when fully proofed. A proofer of the kind referred to is shown and described in United States Patent No. 1,832,895, issued to H. Devlin on November 24, 1931, to which reference may be had for a disclosure of its structure and operation. It has been deemed sufficient here to indicate two of the trays by the numerals 25 and 26 and to point out that one of them, 25, receives a dough piece from the lower chute 24 when in the location indicated by dotted lines, and immediately afterward receives a second piece alongside the first from the other chute 23 as the tray moves upwardly. Two pieces thus enter the proofer together and rest side by side in the two middle pockets 4a, 5a of each tray.

The timing of the dough piece deliveries from the chutes 23, 24 is made to correspond with the arrival of the proofer trays 25, 26 at the ends of the chutes. This is done in known manner, hence illustration of the mechanism for that purpose is omitted for the sake of clearness in describing my claimed invention.

Having thus described my invention, what I claim and desire to secure by Letters Patent is:

1. A conveyer bucket formed with a bottom portion that slopes downwardly from the upper part of one end wall to the lower part of the bucket at the opposite end wall, the lower part of said bottom portion being formed to present a pocket-like depression offset from the median line of the bucket, a rear wall constituting a chute for discharge of material from the pocket, and a front wall for said pocket.

2. A structure as set forth in claim 1 wherein the bucket is mounted on a movable conveyer chain and means is provided to tilt the bucket at one point in its travel so as to empty the contents of the offset pocket to a discharge station located at one side of the median line of the conveyer.

3. A structure as set forth in claim 1 wherein a plurality of said buckets are mounted on a chain conveyer, certain of the buckets being positioned with their pockets disposed at one side of the median line of the conveyer and certain others with their pockets at the opposite side thereof.

4. A structure as set forth in claim 1 wherein the exterior bottom portion of the bucket adjacent the pocket is formed to present a deflecting surface for materials discharged from an adjacent bucket.

5. In a conveyer, a bucket formed with a bottom portion that slopes downwardy in a direction transverse to the direction of travel of the conveyer, the slope being sufficiently steep to constrain bodies of material deposited thereon to pass down to the lower part of said bottom portion and to thereby offset themselves from the median line of the bucket, a rear wall constituting a chute for discharge of material from the bucket, and a front wall enclosing the lower part of the said inclined bottom portion.

6. A conveyer bucket adapted to be mounted on a movable conveyer and having a bottom comprising an inclined chute portion and a pocket, the chute portion being arranged to constrain materials delivered thereon to move into the pocket in a direction crosswise of the direction of travel of the conveyer.

7. In a conveyer, a bucket having a bottom that is inclined in a direction transverse to the normal direction of travel of the bucket when loaded, the slope being sufficient to cause materials deposited thereon to roll or slide to a place in the bucket at one side of the median line of the conveyer.

CHESTER A. SUNDBOM.